United States Patent [19]

Harrell, Jr.

[11] Patent Number: 4,770,637

[45] Date of Patent: Sep. 13, 1988

[54] DENTAL EDUCATIONAL DEVICE

[76] Inventor: N. Gladstone Harrell, Jr., 1717 Swannanoa Dr., Greensboro, N.C. 27410

[21] Appl. No.: 151,955

[22] Filed: Feb. 3, 1988

[51] Int. Cl.[4] .............................................. G09B 23/34
[52] U.S. Cl. ...................................... 434/263; 434/370
[58] Field of Search ......................... 434/263, 264, 370

[56] References Cited

U.S. PATENT DOCUMENTS

| | | | |
|---|---|---|---|
| 1,045,920 | 12/1912 | Wenker | 434/263 |
| 1,967,786 | 7/1934 | Schulz | 434/263 |
| 2,005,114 | 6/1935 | Spitzer et al. | 434/263 |
| 2,060,869 | 11/1936 | Hopkins | 434/263 |
| 2,256,667 | 9/1941 | Doret | 434/263 |
| 2,988,823 | 6/1961 | Rosenbloom | 434/272 |
| 3,009,267 | 11/1961 | Bezark | 434/272 |
| 3,771,227 | 11/1973 | Black | 434/263 |
| 3,815,244 | 6/1974 | Hein | 434/263 |
| 3,886,661 | 6/1975 | Neill | 434/263 |
| 4,073,071 | 2/1978 | Angelotti | 434/264 X |

Primary Examiner—William H. Grieb

[57] ABSTRACT

A dental educational device is presented for use in the oral hygiene field to better inform patients and the like of the proper procedures for cleaning teeth and gums with toothbrushes, floss or other tools. The artificial teeth are formed from a transparent material and include a removable top and if desired a portion of a side whereby, upon removal of the top, an observer can see through the side walls of the tooth to better see and understand the contact of the toothbrush bristles or floss with the outer enamel of the teeth and sulcus areas of the gums.

13 Claims, 2 Drawing Sheets

DENTAL EDUCATIONAL DEVICE

BACKGROUND OF THE INVENTION

1. Field of the Invention

The present invention relates to an educational device and particularly a device for use in the dental hygiene field to teach and assist professionals and patients in the most proper and efficient techniques for cleaning and maintaining teeth and gums with brushes, floss and other implements.

2. Description of the Prior Art and Objectives of the Invention

Health professionals in the dental field are constantly learning and teaching suitable methods of cleaning and maintaining human teeth and gums. Various aids are now available to patients such as prototypes formed from clear, solid plastic of human teeth, charts, photographs, descriptive literature, video presentations and other materials. With such modern educational tools, dental hygiene information has had tremendous dissemination in recent years but even so, many patients are still unable to properly clean and maintain their teeth and gums between dental visits due to, among other things, their lack of knowledge and understanding of their teeth structure and the proper use of a toothbrush and floss to obtain adequate oral hygiene. In teaching patients how to brush and floss, models are often employed which can increase awareness in the patient's mind of certain problem areas in the mouth. Even so, conventional models having teeth formed of a clear, solid plastic generally only allow the patient to view the outside surfaces of the teeth and gums due in part to the brush itself obstructing the tooth surface being cleaned. Thus, patients oftentimes do not carry out the necessary maintenance tasks to their best advantage since they lack a clear understanding of how to accomplish the desired goals.

With this background in mind, the present invention was conceived and one of its objectives is to provide a dental educational device which includes hollow transparent teeth which will allow the patient to view the cleaning action of a brush or other implement through the side walls of the teeth to help the patient better understand dental hygiene techniques and to convince patients of the results obtained and necessity of proper cleaning.

It is still another objective of the present invention to provide a dental educational device whereby the tops or a top and portion of a side of the teeth are removable so a patient can see from the inside of the tooth the exact contact being made between the tooth and gums with the bristles of a toothbrush or other instrument.

It is also an objective of the present invention to provide an educational device which is relatively inexpensive to manufacture and yet which can be conveniently and easily handled by a technician or patient.

Various other objectives and advantages of the present invention become apparent to those skilled in the art as a more detailed description of the invention is presented below.

SUMMARY OF THE INVENTION

The present invention consists of a dental educational device in the form of a denture which includes a plurality of teeth positioned in a gum replica. The teeth are formed from a rigid, transparent material and one or more of the teeth have a top and possibly a side which is removable from the body portion of the tooth formed by side walls which surround a central cavity. When the top is removed from the body portion, an observer can see the side walls of the tooth to observe a toothbrush or floss as it acts against the outer surface of the tooth and gums by looking through only one transparent wall.

DESCRIPTION OF THE PREFERRED EMBODIMENT

Figures 1, 2:
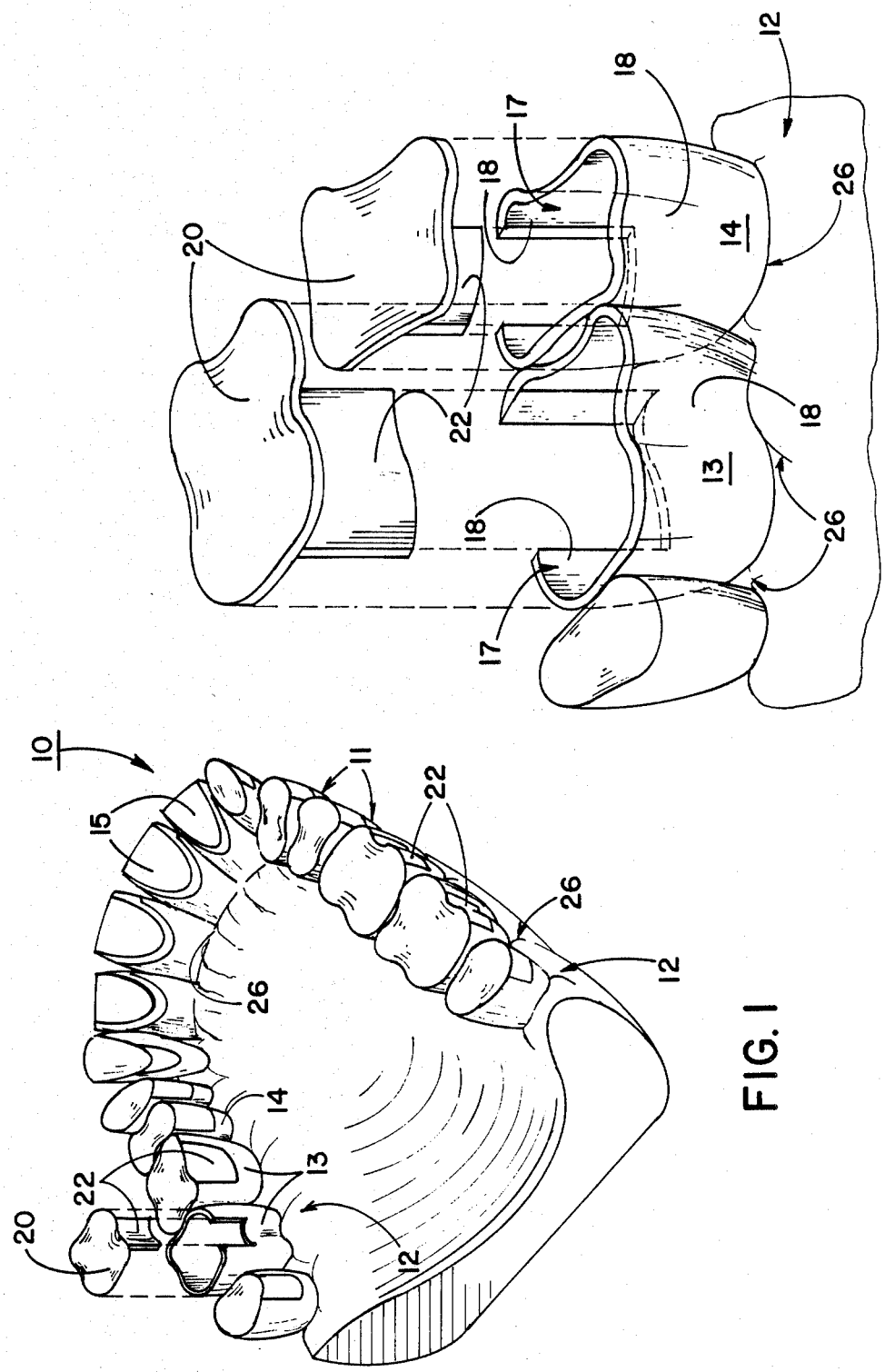
FIG. 1 is a perspective view of an educational device of the invention simulating the lower gums and teeth of a human.
FIG. 2 shows a partial inside elevational view of portions of the device of FIG. 1.

The preferred form of the invention is shown in FIG. 1 in which the mandibular section is presented for an adult human. The teeth are formed from a rigid, transparent plastic material such as acrylic and caps or tops and possibly a side wall are provided on certain hollow teeth whereby upon removal an observer can see through the teeth to better observe brushing or other dental techniques applied on the outer surfaces and proximate gum areas. The sulcus areas of the gums are formed from a relatively soft plastic material to better simulate the human gums. The gums could also be of a hard plastic material with the gingiual sulcus slightly open to allow bristles on the brush to enter slightly for additional durability.

DETAILED DESCRIPTION OF THE DRAWINGS AND OPERATION OF THE INVENTION

Turning now to the drawings, FIG. 1 demonstrates in perspective fashion a dental educational device 10 representing the mandibular teeth 11 and gums 12 of an adult or younger human. Device 10 also demonstrates healthy teeth and gums but other models could be constructed with moderate or severely advanced peridontal disease to illustrate the problems which arise with improper cleaning and maintenance. Molars 13, pre-molars 14, eyeteeth and incisors 15 are shown. In FIG. 2, molars 13 and pre-molars 14 have tops 20 which are removable and engageable with their respective body portions 16. As further shown in FIG. 2, molars 13 and pre-molars 14 are contiguous and all the teeth as seen in the figures herein are hollow formed from a rigid, transparent polymeric material such as an acrylic, polycarbonate or other suitable synthetic or natural substances. Top 20 as shown in FIG. 2 is also formed from a transparent acrylic material and cavity 17 which is contained by side walls 18 of molar 13 and pre-molar 14 can be seen with top 20 with depending flange 22 raised. Thus, as would be understood, since side walls 18 are transparent, by removing top 20 an observer can see through the side walls 18 to better understand the angle of contact and motion with brush 19 with the teeth and gums as in FIG. 3. As shown in FIG. 4, incisor 15 has a top 21 with an attached depending flange 28 which forms part of the sidewall 25 on incisor 15 when engaged therewith. As incisor 15 is substantially narrow, by removal of a portion of sidewall 25 the observation therethrough is greatly improved. Gums 12 are formed from a plastic material and the sulcus areas 26 surrounding teeth 11 at the teeth gum juncture as in FIG. 2 are formed from a soft or hard plastic material to simulate actual sulcus areas of human gums.

Figure 3:
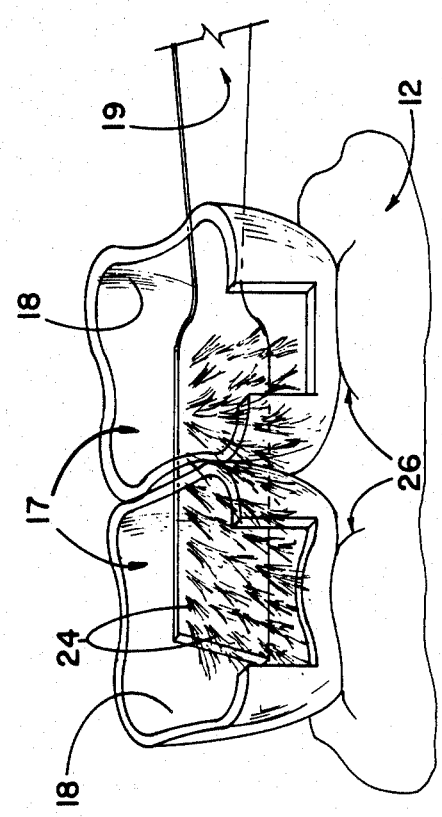
FIG. 3 shows certain of the teeth as shown in FIG. 2 with the crown removed and a toothbrush being applied thereto.
Figure 5:
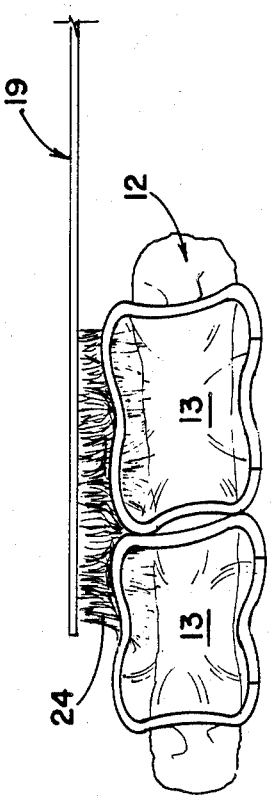
FIG. 5 demonstrates a top plan view of the teeth and brush as seen in FIG. 3.
Figure 4:
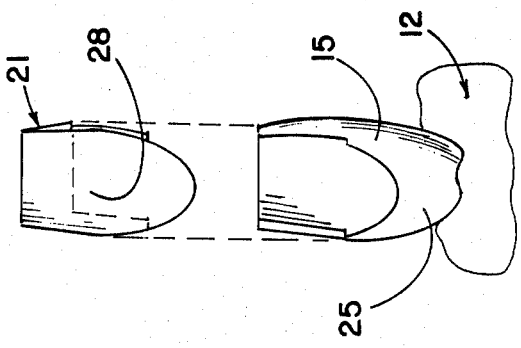
FIG. 4 demonstrates another of the teeth as shown in FIG. 2 with the crown and depending flange engaged therewith.

In FIGS. 3 and 5, the deflection of bristles 24 of brush 19 is apparent especially as seen through cavity 17 and side walls 18 of molars 13 having tops 20 (not seen) removed therefrom. The deflection of bristles 24 against the outer surfaces of side walls 18 will better make available to students proper brushing techniques and will show in realistic fashion the scrubbing action of a toothbrush on the teeth and gum surfaces and show that certain areas between teeth cannot be cleaned by brushing alone but must be flossed. Gingevitis is a major problem for many dental patients who neglect brushing the sulcus gum area 26 (FIG. 2) which surrounds the teeth at the gum line. Plaque which forms in the sulcus area is a major cause of unhealthy teeth and gums and proper brushing will assist in alleviating this problem. Device 10 as seen in FIG. 1 allows for a more meaningful demonstration of proper brushing techniques since the contact area between the tooth and bristles 24 is viewable. As seen in FIG. 1, the inside side wall of molars 13 and premolars 14 form the top flange 26 along the left side of device 10, whereas along the right side, the outside side walls form the flange.

In FIG. 5, toothbrush 19 is shown with certain of its soft bristles 24 deflected and other non-deformed bristles between molars 13. As illustrated in FIG. 3, an observer can determine the action of the deformed bristles 24 against the outer surfaces 18 of molars 13 to better understand the brushing action and how to effectively brush to remove teeth and gum plaque. Conventional toothbrushes, interproximal brushes, stimudents, floss and other cleaning apparatus can be better illustrated with the use of device 10.

The illustrations and examples provided herein are for explanatory purposes and are not intended to limit the scope of the appended claims.

I claim:

1. An educational device comprising: an artificial tooth, said tooth formed from a rigid, transparent material, said tooth having a body portion, said body portion having side walls, said walls defining a cavity therebetween, a top, said top releasably engageable with said body portion whereby upon removing said top from said body portion an observer can see through said side walls.

2. An educational device as claimed in claim 1 wherein said body portion is formed from an acrylic.

3. An educational device as claimed in claim 1 wherein said top is formed from a transparent material.

4. An educational device as claimed in claim 1 wherein said top includes a depending member, said depending member forming a portion of said side wall when said top is engaged with said body portion.

5. An educational device as claimed in claim 1 wherein said tooth simulates a molar.

6. An educational device as claimed in claim 1 wherein said tooth simulates a premolar.

7. An educational device as claimed in claim 1 wherein said tooth simulates an incisor.

8. An educational device as claimed in claim 1 wherein said tooth simulates a canine.

9. An educational device comprising: a denture, said denture including a plurality of hollow artificial teeth, artificial gums, said teeth mounted in said artificial gums, said teeth formed from a rigid, transparent material, and at least one of said teeth including a removable top.

10. An educational device as claimed in claim 9 wherein said denture comprises a plurality of molars and a plurality of incisors.

11. An educational device as claimed in claim 9 wherein said denture comprises a plurality of premolars and a plurality of canines.

12. An educational device as claimed in claim 9 wherein a portion of said gums are formed from a soft, resilient material.

13. An educational device as claimed in claim 9 wherein a portion of said gums are formed from a hard, rigid plastic.

* * * * *